E. CUTCLIFFE.
Subsoil Attachments for Plows.
No. 143,335. Patented September 30, 1873.
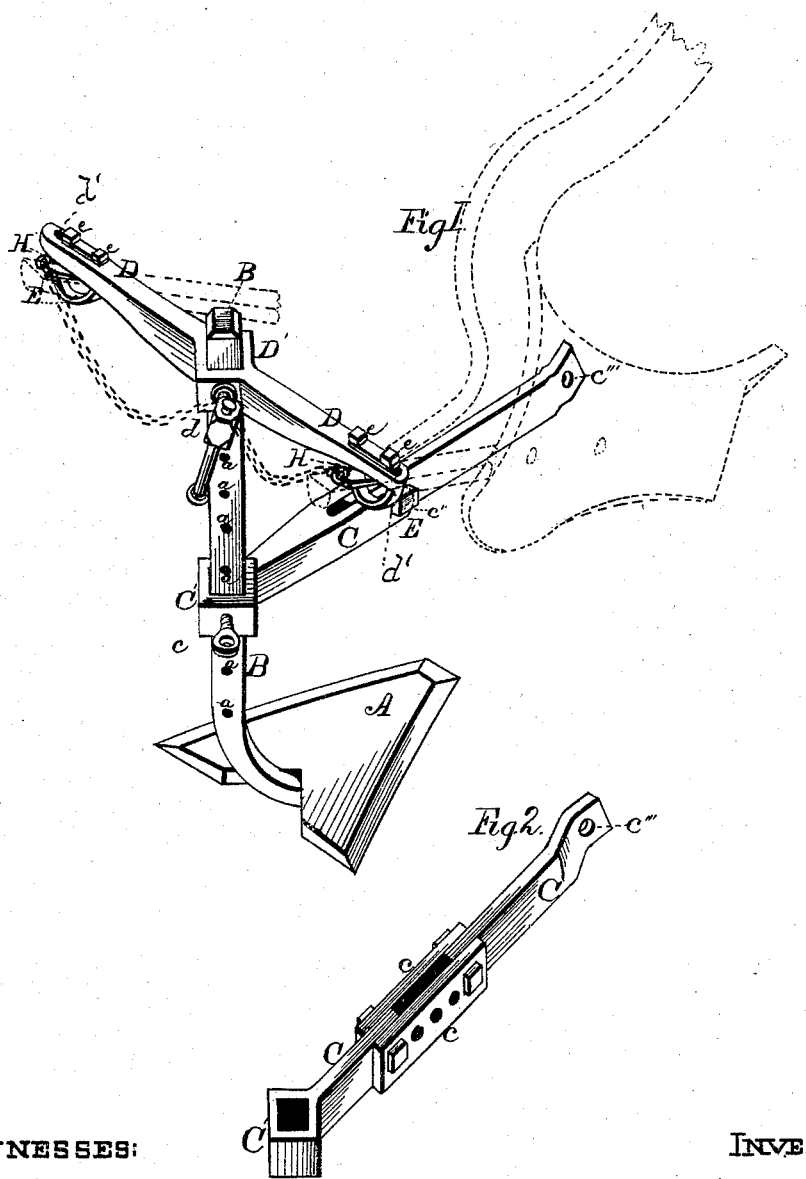

UNITED STATES PATENT OFFICE.

EDWARD CUTCLIFFE, OF EAST BETHANY, NEW YORK.

IMPROVEMENT IN SUBSOIL ATTACHMENTS FOR PLOWS.

Specification forming part of Letters Patent No. 143,335, dated September 30, 1873; application filed July 30, 1873.

*To all whom it may concern:*

Be it known that I, EDWARD CUTCLIFFE, of East Bethany, in the county of Genesee, and in the State of New York, have invented certain new and useful Improvements in Subsoil Attachments for Plows; and do hereby declare that the following is a full, clear, and exact description thereof, reference being had to the accompanying drawing making a part of this specification, in which—

Figure 1 shows a perspective view of my subsoil attachment, the plow being indicated in outline. Fig. 2 is a detail of the brace, showing a modification in construction.

Letters of like name and kind refer to like parts in each of the figures.

My invention consists in the method or means for attaching the subsoil-foot to the plow, whereby it can be raised or lowered, as occasion may require; and in the attachment to the standard of a cross bar or piece, through the ends of which the plow-handles are passed; and in adjusting the cross-bar on this standard; and in wedges to regulate the position of the point or foot of the attachment; and in constructing the brace which connects the subsoil-foot with the mold-board with a joint or joints, so that its ends will have a vertical motion.

In this invention, I have designed to cover the following important requisites in devices of this description: I have so made and applied the brace that the plow and subsoil attachment can each have a motion without detriment to the other, or injury to the device, or decreasing its operative efficiency, while the end attached to the standard can be raised or lowered at will. I have so constructed and applied the cross-brace that it can be easily adjusted in vertical position by means of a set-screw, which clamps the brace to the standard in a firm and secure manner. In each end of the cross-brace I fix a clip, through which the plow-handles pass, and in which they are rigidly held by wedges. I provide the wedges to fasten the handles in the clips, which will regulate the position of the foot. Placed on one side, they lower the point, and on the other they raise it.

In the accompanying drawing, A represents the subsoil foot or attachment, to which is connected, in any secure manner, the standard B. The sleeve or collar C' of the brace C, which is attached at one end to the mold-board, can be adjusted at any desired height by the set-screw $c'$, which, passing through the collar, enters indentations $a$. The upper portion of the standard, in like manner, passes through the collar D' of the cross-brace D. This cross-brace is held in any required position on the standard by set-screw $d$, which, passing through the collar, fits into indentations $a$. To the ends of the cross-brace are attached clips E, which are made in bow form, the free ends projecting up through the slots $d'$, and on their threaded ends having nuts $e$. The slots $d'$ are sufficiently long to allow the clips to be moved laterally, so as to accommodate a greater or less width between the handles of different plows. The handles may be firmly fixed in the clips by means hereinafter described.

It may be generally desirable to construct the brace C with one joint, as at $c''$, whereby all difference in motion between the point of the plow and the subsoil attachment is readily provided for; or this brace may have a double joint, as in Fig. 2, which is readily made by the coupling-bars $c$, which fit, one on each side of the divided bar C, and are held in place by nuts and bolts.

By the adjustment of the bolts in the holes of the coupling-bars the brace may be made as long or short as occasion may require. The brace is attached or fixed upon the mold-board by a bolt which passes through the hole $c'''$, and is secured by a nut.

H H are wedges to hold the handles firm. When placed in the position shown—that is, toward the operator or plowman—the point of the subsoil attachment will be lowered. If placed on the other side—toward the team—they operate to raise the point.

Having thus fully set forth the nature and merits of my invention, what I claim as new is—

1. The cross-brace D, having clips in the slots in each end, adapted to accommodate the varying widths of plow-handles, and a collar, D', and combined with standard B, in the manner and for the purpose set forth.

2. The brace C, connected with the standard

B at one end, and with the mold-board at the other, and provided with a double or single joint, as set forth.

3. The clips E, when combined with the slotted adjustable cross-brace D, and with the wedges H, and adapted to, and used in combination with, the plow-handles, in the manner and for the purpose set forth.

4. The subsoil foot or attachment combined with the plowshare and handles, and arranged to be moved vertically, and its point raised or lowered, all in the manner and by the means described and set forth.

In testimony that I claim the foregoing I have hereunto set my hand this 28th day of July, 1873.

EDWARD CUTCLIFFE.

Witnesses:
JOHN F. PERRY,
LEONARD HILLMAN.